Figure 1:
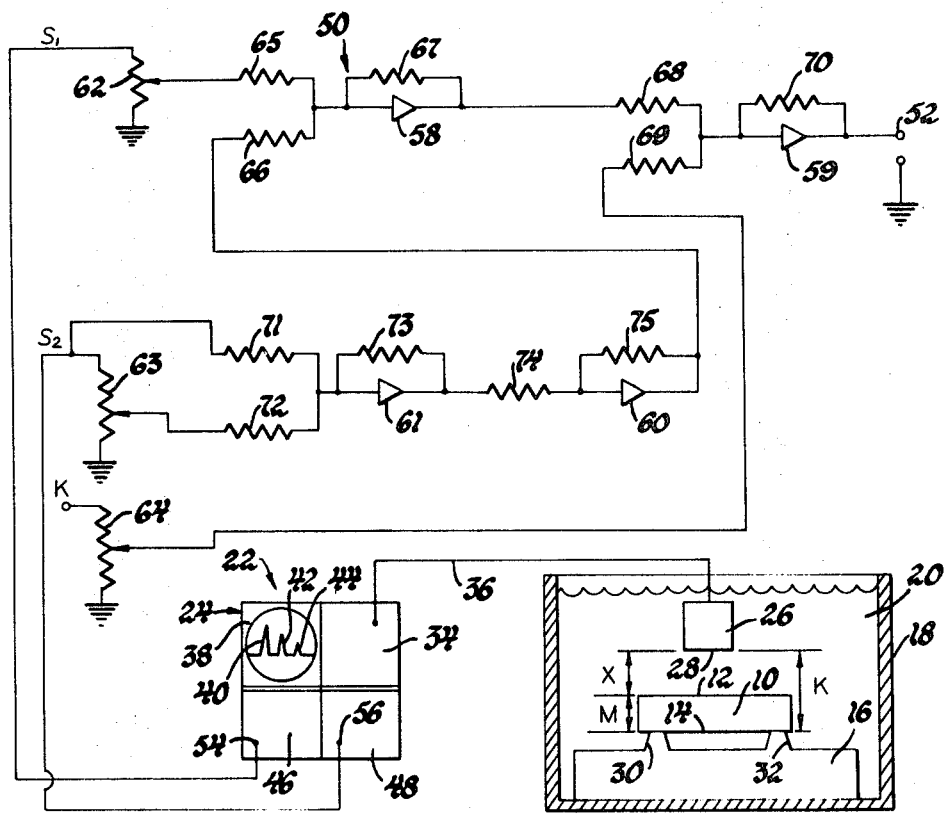

United States Patent

[11] 3,603,136

| [72] | Inventors | Milton J. Diamond |
| | | Saginaw; |
| | | Robert H. Lutch, Birch Run, both of, Mich. |
| [21] | Appl. No. | 879,746 |
| [22] | Filed | Nov. 25, 1969 |
| [45] | Patented | Sept. 7, 1971 |
| [73] | Assignee | General Motors Corporation |
| | | Detroit, Minn. |

[54] ULTRASONIC MEASUREMENT OF MATERIAL NODULARITY
4 Claims, 3 Drawing Figs.

| [52] | U.S. Cl. | 73/67.8 |
| [51] | Int. Cl. | G01n 29/00, G01h 5/00 |
| [50] | Field of Search | 73/67.5, 67.8 |

[56] References Cited
UNITED STATES PATENTS

| 2,706,906 | 4/1955 | Rich | 73/67.5 X |
| 3,003,351 | 10/1961 | Ziegler | 73/67.5 |
| 3,003,352 | 10/1961 | Ziegler | 73/67.5 |

*Primary Examiner*—Richard C. Queisser
*Assistant Examiner*—John P. Beauchamp
*Attorneys*—J. L Carpenter and Paul Fitzpatrick

ABSTRACT: A method and apparatus for determining the percent nodularity of a workpiece as a function of the speed of ultrasonic sound through the workpiece. According to a first embodiment this is achieved by positioning the workpiece at a predetermined distance from an electroacoustic transducer and in a second embodiment by positioning the casting between two electroacoustic transducers which are spaced at a predetermined distance. DC voltage signals relating the time between the generation of the ultrasonic impulses and the detection of back reflection impulses by the electroacoustic transducers are combined by a signal-generating circuit in accordance with an empirical relationship so as to generate a DC voltage output signal proportional to the percent nodularity of the workpiece.

PATENTED SEP 7 1971 3,603,136

SHEET 1 OF 2

INVENTORS
Milton J. Diamond, &
BY Robert H. Lutch

Paul Fitzpatrick
ATTORNEY

ULTRASONIC MEASUREMENT OF MATERIAL NODULARITY

This invention relates to a method and apparatus for determining the percent nodularity of a workpiece, and in particular of a nodular iron casting, as a function of the speed of ultrasonic impulses through the casting.

The term "nodular iron" is descriptive of the shape of graphite particles in the material. As opposed to other types of iron, in nodular iron the graphite particles are in the form of spheroids. These spheroids, or nodules, are a result of the manufacturing process and materials employed in making the iron. Since the presence of graphite in nodular form has a pronounced effect on the mechanical properties of nodular iron, it is important to know that the ratio of nodular graphite particles in a workpiece relative to the total number of graphite particles in the workpiece is within prescribed limits to assure that the workpiece will have the desired mechanical properties for its intended use. This ratio, expressed as a percentage, is therefore descriptive of a material having certain physical properties and is commonly referred to as the "percent nodularity" of the material.

Since it was originally developed in the 1950's nodular iron has been found to be an important material in the manufacturing industry. This is because it can both be easily cast in a variety of shapes and, since cast iron with a large percent nodularity has considerable strength, can be used in a number of applications previously requiring several forgings, which provides the manufacturer with a sizable cost savings.

Several types of test methods and apparatus have been developed to date to assure that the percent nodularity of castings from a particular melt is within the prescribed range. One such method includes making a casting, cutting the casting, polishing and etching an exposed surface of the casting, and visually examining the etched structure to determine the percentage of the graphite particles in nodular form. This method is unsatisfactory in many applications as it is a destructive test and is not adaptable to testing large numbers of castings due to the extensive manual effort involved.

Some nondestructive methods have been developed for determining the percent nodularity of a workpiece. One such nondestructive method includes striking a casting so as to cause it to vibrate at its natural frequency and measuring the decay rate of the vibrations. Another method for nondestructive testing of the percent nodularity of a casting is similar to the former in that the casting is stimulated to vibrate at its natural frequency but differs in that the natural frequency of vibration itself is used as an indication of the percent nodularity of the casting. Larson et al. U.S. Pat. No. 3,284,192 discloses a method and apparatus for nondestructively determining the percent nodularity of a casting according to this method.

Some experimenters in Europe, such as Ziegler and Gerstner, (International Foundry Congress, Stockholm, 1957, Paper No. 6, p. 155), have found that the percent nodularity of a nodular iron casting determines the speed of ultrasonic sound through the casting, the speed of ultrasonic sound through a casting having a large percent nodularity being greater than the speed of ultrasonic sound through a casting having a smaller percent nodularity. However, this basic concept has heretofore not been practical to use in production operations requiring rapid determinations of percent nodularity because the speed of ultrasonic sound through a casting is measured as a function of the time required for the sound waves to pass through the casting, which time depends not only upon the structure of the graphite particles within the casting but also upon the thickness of the casting itself. A greater time is therefore required for the ultrasonic sound to pass through a thicker casting than a thinner casting having an identical graphite particle structure. To determine the percent nodularity of a casting as a function of the speed of ultrasonic sound through the casting has thus heretofore required measuring the actual thickness of the casting by other, usually mechanical, means. The actual thickness of the casting was then divided by the time required for the ultrasonic sound to pass through the casting, the quotient being the velocity of the ultrasonic sound in the casting. It was then necessary to determine the percent nodularity of the casting by reference to a curve relating percent nodularity to velocity of ultrasonic sound, the curve usually having been experimentally obtained using the aforementioned destructive test method.

It is therefore a principal object of this invention to provide a method and apparatus for rapidly determining the percent nodularity of a workpiece as a function of the velocity of ultrasonic sound through the workpiece regardless of the workpiece thickness.

It is an additional object of this invention to provide a method and apparatus for determining the percent nodularity of a workpiece as a function of the velocity of ultrasonic sound through the workpiece regardless of the position of the workpiece relative to the test apparatus.

Figure 2:
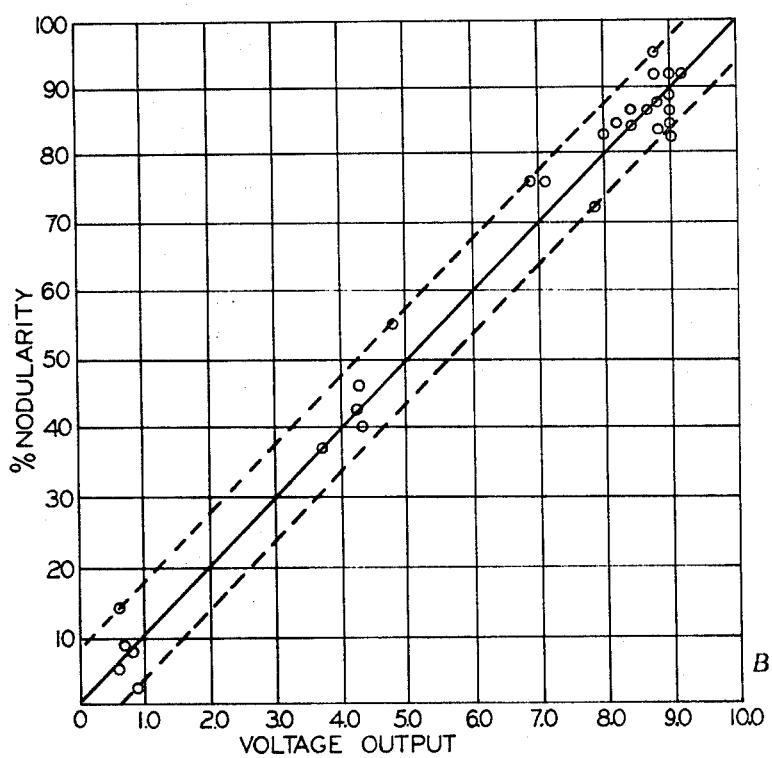
Figure 3:
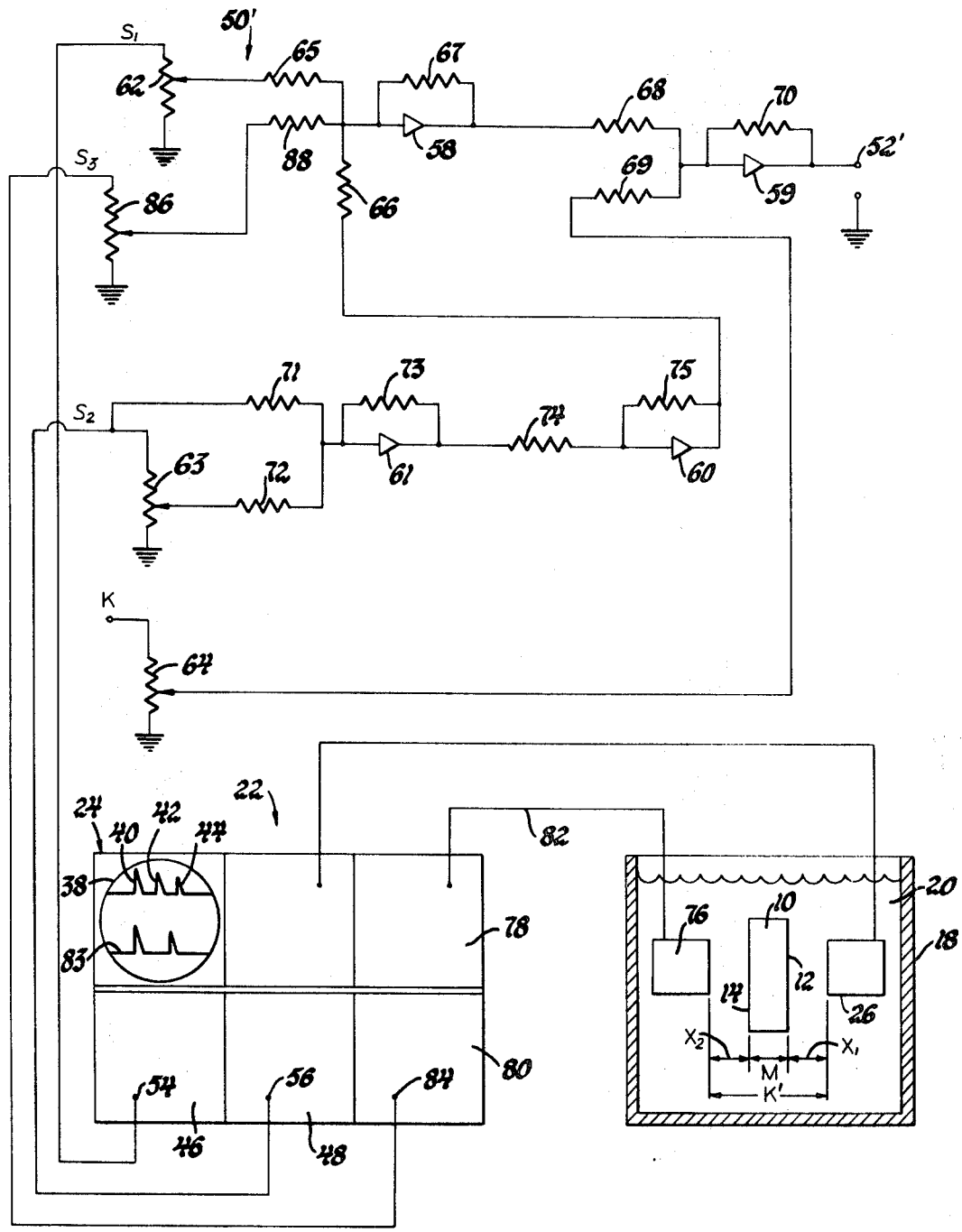

Additional objects and advantages of the present invention will become apparent from the following description and accompanying drawings, in which:

FIG. 1 is a schematic diagram of the test apparatus embodying the principles of the present invention, FIG. 2 is a characteristic curve relating output voltage of the apparatus disclosed in FIG. 1 to the percent nodularity of castings, and FIG. 3 is a schematic diagram of a different embodiment of the apparatus illustrated in FIG. 1.

As is seen in FIG. 1, the percent nodularity of a workpiece 10, which is a nodular iron casting in the illustrated embodiments, is determined according to the subject invention by placing the casting 10, which has first and second substantially opposed surfaces 12 and 14 respectively, on a fixture 16 in a reservoir 18, which contains an ultrasonic coupling medium 20, such as water. Suitable ultrasonic apparatus, generally indicated by the numeral 22, is provided for generating ultrasonic sound in the form of impulses directed at the casting 10 and for detecting ultrasonic sound in the form of back reflection impulses from the first and second surfaces 12 and 14 of the casting 10. While the ultrasonic apparatus 22 may be of many types, as is apparent to persons versed in the art, the type which employs an ultrasonic generator 24 and an electroacoustic transducer 26 has been found very In the illustrated embodiments the ultrasonic generator 24 is the model UM721 Reflectiscope, which is a trademark, manufactured by Sperry Products Division of Automation Industries Inc., Danbury, Connecticut. The crystal transducer 26 is a crystal manufactured for use with the Reflectiscope 24 and has an ultrasonic impulse sending and receiving surface 28. The surface 28 of the crystal 26 is positioned at a predetermined distance K from the sound surface 14 of the casting 10, which is supported at points 30 and 32 of the fixture 16. The Reflectiscope 24, which is designed in modular form, includes a pulser-receiver module 34, which may be the model 5N manufactured by Sperry Products Division, for electrically stimulating the crystal 26 through a lead 36 and for detecting signals generated by the crystal 26 when it is stimulated by the back reflection impulses, the stimulation and signal detection being substantially in the frequency range of 5 to 15 megacycles. In addition, the pulser-receiver module 34 supplies a signal to an oscilloscope 38, which is also a part of the Reflectiscope 24, simultaneous with the stimulation of the crystal 20 by the pulser-receiver module 34, which causes the display of a first pulse 40 on the oscilloscope 38. Upon reception by the pulser-receiver module 34 of signals from the crystal 26 indicative of the detection of the back reflection impulses from the first and second surfaces 12 and 14, the pulser-receiver module 34 supplies subsequent signals to the oscilloscope 38, which displays corresponding second and third pulses 42 and 44, respectively.

A first signal-generating module 46, which may be that sold by Sperry Products Division under style number 50E568, is provided for generating a first DC voltage signal in response to control signals from the Reflectiscope 24, the first DC voltage signal being proportional to the time elapsed between the display of the first and second pulses 40 and 42. A second signal-generating module 48 similar to the first is also provided for generating a second DC voltage signal in response to control signals from the Reflectiscope 24 the second DC voltage signal being proportional to the time elapsed between the display of the second and third pulses 42 and 44.

A signal-generating circuit 50 is provided for combining the first and second DC voltage signals generated by the first and second signal-generating modules 46 and 48 so as to produce a DC voltage output signal at a terminal 52. The magnitude of the DC voltage output signal is proportional to the percent nodularity of the casting 10, as will subsequently be explained.

The operation of the apparatus illustrated in FIG. 1 can best be described by reference to a single ultrasonic impulse generated by the crystal 26. To generate the impulse, the crystal 26 is stimulated by a signal from the pulser-receiver module 34. When so stimulated, the crystal 26 emits an ultrasonic impulse from the surface 28 directed at the casting 10. The ultrasonic impulse is selected to have sufficient energy to pass through both the first and second surfaces 12 and 14 of the casting 10. As persons skilled in the art will appreciate, the passage of an ultrasonic impulse from one medium such as the water 20, into another medium, such as the casting 10, produces a back reflection impulse directed along an angle of reflection equal to the angle of incidence. When these angles are substantially 90°, as in the illustrated embodiment, the back reflection impulse travels in the reverse direction along the path of the ultrasonic impulse. First and second back reflections are therefore produced at the first and second surfaces 12 and 14 directed toward the crystal 26, which generates a signal upon the reception of each back reflection. By properly selecting the period of the ultrasonic impulse and its energy level, the energy of the ultrasonic impulse and the back reflection impulses it produces is dissipated in the casting 10 and the water 20 prior to the generation of a subsequent ultrasonic impulse, thereby preventing interference of wave energy emitted by the crystal 26 in different ultrasonic impulses.

When the ultrasonic impulse is generated by the crystal 26, the first pulse 40 is displayed on the oscilloscope as previously explained. Upon reception of the first back reflection from the first surface 12 by the crystal 26, a signal is generated by the crystal 26 and transmitted through the lead 36 to the pulser-receiver module 34 which, provides for the display of the second pulse 42 on the oscilloscope 38. The displacement between the first and second pulses 40 and 42 on the oscilloscope 38 is thus indicative of the total time required for the ultrasonic impulse to travel from the crystal 26 to the first surface 12 and the time required for the first back reflection impulse to travel from the first surface 12 to the crystal 26. The first DC voltage signal, which is proportional to this time, is presented at a terminal 54 of the first signal-generating module 46.

The energy of the ultrasonic impulse which passes through the first surface 12 of the casting 10, though partially dissipated in the casting 10, passes through the second surface 14, causing the second back reflection impulse at the interface formed by the second surface 14 and the water 20. While some of the energy in the second back reflection is dissipated in the form of a subsequent back reflection impulse at the first surface 12, a substantial portion of the energy in the second back reflection impulse passes through the first surface 12 and strikes the surface 28 of the crystal 26, stimulating the crystal 26 so as to cause it to generate another signal that is transmitted through the lead 36 to the pulser-receiver module 34, which causes the display of the third pulse 44 on the oscilloscope 38. A second DC voltage signal proportional to the time elapsed between the display of the second and third pulses 42 and 44 is generated by the second signal-generating module 48 at a terminal 56. Inasmuch as the time elapsed between the generation of the ultrasonic impulse and the detection of the second back reflection impulse by the crystal 26 is proportional to the sum of the time required for the ultrasonic impulse to pass from the crystal 26 to the second surface 14 and the time for the second back reflection impulse to travel from the second surface 14 to the crystal 26 is represented on the oscilloscope 38 as the distance between the first pulse 40 and the third pulse 44, it is apparent that the time between the display of the second and third pulses 42 and 44 is the total time required for the ultrasonic impulse to travel from the first surface 12 to the second surface 14 and for the second back reflection impulse to travel from the second surface 14 to the first surface 12.

Since the ultrasonic impulse and the back reflection impulses travel at the same velocity through a given medium, the distance X between the surface 28 of the crystal 26 and the first surface 12 may be determined according to the following relationship:

(1) $X = \frac{1}{2} T_1 V_1$ where $T_1$ is the time between the display of the first and second pulses 40 and 42 and $V_1$ is the velocity of the ultrasonic impulses through the water 20, which may be determined by several methods obvious to persons skilled in the art. Since $V_1$ is a constant, the first DC voltage signal, which is proportional to $T_1$, is therefore proportional to $X$.

By positioning the surface 28 of the crystal 26 a predetermined distance K from the second surface 14 the actual thickness M of the casting 10 is determined by the following relationship:

(2) $M = K - X$

The velocity $V_2$ of the ultrasonic impulse through the casting may therefore be determined by the relationship:

(3) $V_2 = 2M/T_2$ where $T_2$ is the time elapsed between the display of the second and third pulses 42 and 44, which time is proportional to the second DC voltage signal.

By substitution for $M$ in equation (3), there is provided the relationship:

(4) $V_2 = 2(K-X)/T_2$

By further substitution for $X$ in equation (4), there is provided the relationship:

(5) $V_2 = (2(K - \frac{1}{2} T_1 V_1)/T_2$

Since $V_1$ and $K$ are constants, $V_2$ is therefore a function solely of $T_1$ and $T_2$, which are proportional to the first and second DC voltage signals, respectively.

While equation (5) relates the velocity of ultrasonic sound through the casting 10 to the first and second DC voltage signals it requires the mathematical operation of division for solution, which operation is not conveniently performed upon DC voltage signals with an analog device. An empirical equation relating the first and second DC voltage signals to the velocity of ultrasonic impulses through the casting 10 is more desirable. Such an equation has been generated by casting several sample castings having differing percent nodularity, generating first and second DC voltage signals by use of the previously described method and apparatus for each of the sample casting, cutting the sample castings, polishing and etching the cut surfaces of the sample casting, visually determining the percent nodularity of each of the sample castings, and generating an empirical relationship relating % NOD, which is percent nodularity, to the first and second DC voltage signals by the use of regression analysis, which may be implemented by a computer program, based on the following relationship:

(6) $\% \, NOD = S_1 + S_2$ where $S_1$ and $S_2$ are the first and second DC voltage signals, which are proportional to $T_1$ and $T_2$, respectively. The empirical relationship thus derived is of the form (7) $\% \, NOD = A_1 S_1 + A_2 S_2 - K_0$ where $A_1$, $A_2$, and $K_0$ are constants that vary in accordance with the particular casting being tested. By way of example only, the following relationship has been found satisfactory in determining the present nodularity of a particular casting:

(8) $\% \, NOD = 0.775 \, S_1 + 1.3 S_2 - 8.35$

The signal-generating circuit 50 combines the first and second DC voltage signals $S_1$ and $S_2$ in accordance with equation (7). The circuit 50 includes a plurality of operational amplifiers 58 through 61, which may be the model 3009/15c manufactured by Burr-Brown Research Corporation of Tucson, Arizona, potentiometers 62 through 64, and resistors 65 through 75, which are operable in accordance with well-known principles to provide the DC output voltage signal at the terminal 52 proportional to the percent nodularity of the casting 10.

To determine the accuracy of the subject apparatus the resistors 65–75 in the signal-generating circuit 50 were selected so as to scale the output DC voltage signal at the terminal 52 according to the ratio of 10 volts to 100 percent nodularity. With the apparatus thus scaled the percent nodularity of a set of sample castings was determined and compared with that determined by use of the earlier described destructive test method. The results of this comparison are shown in FIG. 2, in which the percent nodularity plotted for each of the respective castings is that determined by the destructive method. While perfect correlation between the two test methods would result in all of the points in FIG. 2 lying along the solid line curve, FIG. 2 illustrates the close correlation in the percent nodularity determined by these test methods.

Referring now to FIG. 3 there is provided a different embodiment of the test apparatus illustrated in FIG. 1. A second electroacoustic transducer, which may be a second crystal 76 that is similar to the first crystal 26, positioned a predetermined distance $K'$ from the first crystal 26, a second pulser-receiver module 78, and a third signal-generating module 80 are provided to permit determining, the percent nodularity of the casting 10 without the need for physically contacting the casting 10, as was done by the fixture 16. In FIG. 3, the operation of the first crystal 26 and the apparatus associated therewith is the same as was previously described in regard to FIG. 1. However, in FIG. 3 the second pulser-receiver module 78, which is also controlled by the Reflectiscope 24, is 180° out of phase with the first pulser-receiver module 34 so as to stimulate the second crystal 76 through a lead 82 after the detection by the crystal 26 of the second back reflection and before the generation of a subsequent ultrasonic impulse by the crystal 26. The stimulation of crystal 76 by the second pulser-receiver module 78 causes the generation of an ultrasonic impulse from the second crystal 76 directed at the second surface 14 of the casting 10. When the ultrasonic impulse from the second crystal 76 passes through the second surface 14 of the casting 10 it produces a third back reflection impulse directed at the second crystal 76. When the second crystal 76 detects the third back reflection impulse it generates a signal that is transmitted through the lead 82 to the second pulser-receiver module 78. A separate trace 83 of the oscilloscope 28 displays these occurrences as earlier described with reference to the first and second pulses 40 and 42. The third signal-generating module 80, operating in the fashion previously described in connection with the first signal-generating module 46, provides a third DC voltage signal $S_3$ proportional to the time elapsed between the generation of the ultrasonic impulse by the second crystal 76 and the detection of the third back reflection impulse. The signal $S_3$ is provided at a terminal 84 on the third signal generating module 80. Since the velocity of the ultrasonic impulse through the water 20 is a constant, as previously discussed, the signal $S_3$ is also proportional to the distance $X_2$ between the second crystal 76 and the second surface 14 of the casting 10. It is thus apparent that:

(9) $K' = X_1 + X_2 + M$ and that the percent nodularity is a function of the first, second, and third DC voltage signals $S_1$, $S_2$, and $S_3$ provided by the apparatus in FIG. 3. Accordingly, from the relationship:

(10) $\% NOD = (S_1 + S_3) + S_2$ regression analysis was performed with the aid of the computer on the test results obtained from the test samples in the fashion previously described to obtain an empirical relationship relating percent nodularity to these DC voltage signals. The empirical relationship thus obtained was of the form

(11) $\% NOD = A_1(S_1 + S_3) + 1.3 S_2 - 8.35$ and for the particular casting previously mentioned was

(12) $\% NOD = 0.775(S_1 + S_3) + 1.3 S_2 - 8.35$

It is to be noted that equations (11) and (12) are identical to equations (7) and (8), respectively, but for the $S_3$ term.

A second signal-generating circuit 50' is provided, as shown in FIG. 3, to combine the first, second, and third DC voltage signals $S_1$, $S_2$, and $S_3$ according to this relationship and to provide a second DC output signal at a terminal 52', which signal is proportional to the percent nodularity of the casting 10. Since there is considerable similarity between the equations the first and second signal-generating circuits 50 and 50' are the same but for an additional potentiometer 86 and resistor 88, which assist in combining $S_1$ and $S_3$ in accordance with well-known principles.

The percent nodularity of sample castings was determined through the use of the apparatus illustrated in FIG. 3 and through the destructive test previously described. The results of this comparison were substantially the same as the comparison illustrated in FIG. 2, indicating that both of the illustrated embodiments are suitable to determine the percent nodularity of castings.

While reference has been made in discussing the illustrated embodiments to the generation of DC output signal at the terminal 52, persons skilled in the art will appreciate that the DC output signal may be used to control several operations, depending upon the needs of a particular situation. For example, the DC output signal may be used to drive a meter (not shown) having a scale calibrated to indicate percent nodularity directly or the speed of the ultrasonic impulses through the casting 10. In the alternative, the DC output signal may be used to actuate a relay (not shown) or light a lamp (not shown) which serves to indicate whether the percent nodularity of the casting 10 is within a predetermined percent nodularity range. Several other operations may be performed by using the DC output signal, as those versed in the art will recognize.

the casting is thus apparent that a new and useful nondestructive technique is provided for determining the percent nodularity of a casting without contacting the casting and without placing the casting in a certain position relative to the test apparatus.

We claim:

1. Apparatus for determining the percent nodularity of a workpiece having first and the generation substantially opposed surfaces comprising, in combination, ultrasonic impulse generating and detecting means including an ultrasonic generator and an electroacoustic transducer positioned adjacent the first surface and at a predetermined distance from the second surface both for generating an ultrasonic impulse directed so as to enter the workpiece through the first surface and leave the workpiece through the second surface, the passage of the ultrasonic impulse through the first and second surfaces producing first and second back reflection impulses, respectively, and for detecting the first and second back reflection impulses, first signal-generating means responsive to the ultrasonic impulse generating and detecting means for generating a first signal in accordance with the time between the generation of the ultrasonic impulse and the detection of the first back reflection impulse, second signal-generating means responsive to the ultrasonic impulse generating and detecting means for generating a second signal in accordance with the time between the detection of the first back reflection and the detection of the second back reflection, and output signal-generating means responsive to the first and second signals for generating an output signal indicative of the percent nodularity of the workpiece in accordance with the first and second signals.

2. The method of determining the percent nodularity of a workpiece having first and second substantially opposed surfaces comprising the steps of positioning an electroacoustic transducer adjacent the first surface and at a predetermined distance from the second surface, stimulating the electroacoustic transducer with an ultrasonic generator whereby the electroacoustic transducer generates at least one ultrasonic impulse directed at the workpiece so as to enter the workpiece through the first surface and leave the workpiece through the second surface, the passage of the ultrasonic impulse through the first and second surfaces causing first and second back reflection impulses, respectively, detecting the first and second back reflection impulses produced by the ultrasonic impulse entering and leaving the workpiece, generating a first signal indicative of the time between the generation of the ultrasonic impulse and the detection of the first back reflection impulse, generating a second signal indicative of the time between the detection of the first back reflection impulse and the detection of the second back reflection impulse, and generating an output signal indicative of the percent nodularity of the workpiece by combining the first and second signals in accordance with a known empirical relationship.

3. The method of determining the percent nodularity of a workpiece having first and second substantially opposed surfaces comprising the steps of positioning first and second electroacoustic transducers at a predetermined distance from each other for generating ultrasonic impulses directed at the workpiece and for detecting the back reflection impulses produced by the ultrasonic impulses entering and leaving the workpiece, placing the workpiece between the first and second electroacoustic transducers so as to position the first surface adjacent the first electroacoustic transducer and the second surface adjacent the second electroacoustic transducer, stimulating the first electroacoustic transducer with an ultrasonic generator whereby the first electroacoustic transducer generates a first ultrasonic impulse directed so as to enter the workpiece through the first surface and to leave the workpiece through the second surface, the passage of the first ultrasonic impulse through the first and second surfaces producing first and second back reflection impulses, respectively, detecting the first back reflection impulse with the first electroacoustic transducer, generating a first signal indicative of time between the generation of the first ultrasonic impulse and the detection of the first back reflection impulse, detecting the second back reflection impulse with the first electroacoustic transducer, generating a second signal indicative of the time between the detection of the first back reflection impulse and the detection of the second back reflection impulse, stimulating the second electroacoustic transducer with an ultrasonic generator whereby the second electroacoustic transducer generates a second ultrasonic impulse directed so as to enter the workpiece through the second surface, the passage of the second ultrasonic impulse through the second surface producing a third back reflection impulse, detecting the third back reflection with the second electroacoustic transducer, generating a third signal indicative of the time between the generation of the second ultrasonic impulse and the detection of the third back reflection impulse, and generating an output signal indicative of the present nodularity of the workpiece by combining the first, second, and third signals in accordance with a known empirical relationship.

4. Apparatus for determining the percent nodularity of a workpiece having first and second substantially opposed surfaces comprising, in combination, first ultrasonic impulse generating and detecting means including a first ultrasonic generator and a first electroacoustic transducer positioned adjacent the first surface for generating a first ultrasonic impulse directed so as to pass through the first and second surfaces, the passage of the first ultrasonic impulse through the first and second surfaces producing first and second back reflection impulses, respectively, and for detecting the first and second back reflection impulses; second ultrasonic impulse generating and detecting means including a second ultrasonic generator and a second electroacoustic transducer positioned adjacent the second surface both for generating a second ultrasonic impulse directed so as to pass through the second surface, the passage of the second ultrasonic impulse through the second surface causing a third back reflection impulse, and for detecting the third back reflection impulse; first signal-generating means responsive to the first ultrasonic impulse generating and detecting means for generating a first signal indicative of the time between the generation of the first ultrasonic impulse and the detection of the first back reflection impulse; second signal-generating means responsive to the first ultrasonic impulse generating and detecting means for generating a second signal indicative of the time between the detection of the first back reflection impulse and the detection of the second back reflection impulse; third signal-generating means responsive to the second ultrasonic impulse generating and detecting means for generating a third signal indicative of the time between the generation of the second ultrasonic impulse and the detection of the third back reflection impulse; and output signal-generating means responsive to the first, second and third signals for generating an output signal indicative of the percent nodularity of the workpiece in accordance with the first, second and third signals.

PO-1050
(5/69)

UNITED STATES PATENT OFFICE
CERTIFICATE OF CORRECTION

Patent No. __3,603,136__    Dated __September 7, 1971__

Inventor(s) __Milton J. Diamond and Robert H. Lutch__

It is certified that error appears in the above-identified patent and that said Letters Patent are hereby corrected as shown below:

Column 2, line 44, "found very" should read -- found very satisfactory. --; line 48, "The crystal" should read -- The electroacoustic --; line 52, "sound surface" should read -- second surface --.

Column 4, equation (3), that portion of the equation reading $V_2 = 2M/T_2)/$ should read $V_2 = 2M/T_2$ Column 4, equation (5), that portion of the equation reading $V_2 = (2(K-\frac{1}{2}T_1V_1)/T_2$ should read $V_2 = 2(K-\frac{1}{2}T_1V_1)/T_2$ Column 5, line 43, "of crystal 76" should read -- of the second crystal 76 --.

Column 6, line 39, "the casting is thus apparent" should read -- It is thus apparent --.

Signed and sealed this 29th day of February 1972.

(SEAL)
Attest:

EDWARD M. FLETCHER, JR.
Attesting Officer

ROBERT GOTTSCHALK
Commissioner of Patents